(12) United States Patent
Luo et al.

(10) Patent No.: US 9,792,728 B2
(45) Date of Patent: Oct. 17, 2017

(54) METHOD AND APPARATUS FOR 3D MESH DE-NOISING

(75) Inventors: Tao Luo, Beijing (CN); Wenfei Jiang, Beijing (CN); Jiang Tian, Beijing (CN)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 14/420,426

(22) PCT Filed: Aug. 17, 2012

(86) PCT No.: PCT/CN2012/080301
§ 371 (c)(1),
(2), (4) Date: Feb. 9, 2015

(87) PCT Pub. No.: WO2014/026378
PCT Pub. Date: Feb. 20, 2014

(65) Prior Publication Data
US 2015/0221131 A1   Aug. 6, 2015

(51) Int. Cl.
*G06T 17/20*   (2006.01)
*G06K 9/46*   (2006.01)
*G06T 5/00*   (2006.01)

(52) U.S. Cl.
CPC .......... *G06T 17/205* (2013.01); *G06K 9/4638* (2013.01); *G06T 5/002* (2013.01);
(Continued)

(58) Field of Classification Search
None
See application file for complete search history.

(56) References Cited

U.S. PATENT DOCUMENTS

| 6,590,575 B1 | 7/2003 | Takezawa |
| 6,987,511 B2 | 1/2006 | Taubin |

FOREIGN PATENT DOCUMENTS

| CN | 101354793 | 1/2009 |
| CN | 101877148 | 11/2010 |
| WO | WO0178005 | 10/2001 |

OTHER PUBLICATIONS

Author:Zhang et al. Title: "Multilateral Filter Denoising Method Based on Meanshift for Point-Sampled Model", IEEE, 978-1-4244-5272-9. Jan. 2009, p. 1-5.*

(Continued)

*Primary Examiner* — Kee M Tung
*Assistant Examiner* — Yanna Wu
(74) *Attorney, Agent, or Firm* — Tutunjian & Bitetto, P.C.

(57) ABSTRACT

Disclosed are a method and apparatus for processing a 3D model. To preserve fine structures while de-noising a 3D mesh model, the local structural information around a vertex is captured when designing a de-noising filter. In particular, for a current vertex to be processed, a path, for example, a geodesic path, is determined between the current vertex and each neighboring vertex. For each mesh edge along the path, local variations are calculated for the two end vertices of the mesh edge using a covariance matrix, and a geometric variation for the mesh edge is calculated as the difference between the two local variations. Then structural information for the region between the current vertex and a neighboring vertex is calculated as a function of the geometric variations for mesh edges along the path, for example, as the maximum geometric variation along the path. The present principles can also be adjusted to be used in de-noising 3D point-based models.

12 Claims, 5 Drawing Sheets

(52) U.S. Cl.
CPC .... *G06T 17/20* (2013.01); *G06T 2207/20172* (2013.01); *G06T 2210/56* (2013.01)

(56) References Cited

OTHER PUBLICATIONS

Author:Tian et al. Title:"Effective Image Noise Removal Based on Difference Eigenvalue", 2011 18th IEEE International Conference on Image Processing, p. 3357-3360.*
Author:He et al. Title: "Computing Nearest-Neighbor Field via Propagation-Assisted KD-Trees", IEEE, 978-1-4673-1226-4, Jun. 2012, p. 111-118.*
Author:Wang et al. Title:"Noise intensity-based denoising of point-sampled geometry", 2008 Second nternational Conference on Future Generation Communication and Networking Symposia, p. 27-30.*
Tongguang etal., "Fast Denoising Method for Point-Sampled Model," Computer Applications and Software, Sep. 30, 2010, vol. 27, No. 9, pp. 69-71.
Yang etal., "Multilateral Filter Denoising Algorithm for Point-sampled Models," Journal of Image and Graphics, Mar. 31, 2007, vol. 12, No. 3, pp. 406-410.
Fleishman et al., "Bilateral Mesh Denoising," ACM Trans. on Graphics, vol. 22, No. 3, pp. 950-953, 2003.
Sun et al., "3D Mesh Skeleton Extraction Using Prominent Segmentation," Computer Science and Information Systems, vol. 7, No. 1, pp. 63-74, Feb. 2010.

* cited by examiner

METHOD AND APPARATUS FOR 3D MESH DE-NOISING

This application claims the benefit, under 35 U.S.C. §365 of International Application PCT/CN2012/080301, filed 17 Aug. 2012, which was published in accordance with PCT Article 21(2) on 20 Feb. 2014 in English.

TECHNICAL FIELD

This invention relates to 3D model processing, and more particularly, to a method and apparatus for de-noising a 3D model.

BACKGROUND 3D models acquired from geometry scanners are usually noisy and irregular. Generally, the acquired 3D data needs to be de-noised and the approximated surface to be smoothed. When a de-noising filter is applied to smooth 3D models, the performance generally depends on the size of the filter. If the size of the filter is too small, noise may not be eliminated sufficiently or more de-noising iterations may be required. If the size is too large, fine details may be oversmoothed. It remains a challenge to remove noise while preserving the fine details of 3D models.

SUMMARY

The present principles provide a method for processing a 3D model, comprising the steps of: accessing the 3D model; determining structural information in a neighborhood around a first vertex of the 3D model; and processing the first vertex in response to the structural information as described below. The present principles also provide an apparatus for performing these steps.

The present principles also provide a method for processing a 3D model, comprising the steps of: accessing a neighborhood around a first vertex of the 3D model; determining a set of mesh edges along a path connecting the first vertex and a second vertex of the neighborhood; determining a geometric variation for at least one edge of the set of mesh edges; determining structural information in the neighborhood in response to the geometric variation along the path; and processing the first vertex in response to the structural information as described below. The present principles also provide an apparatus for performing these steps.

The present principles also provide a computer readable storage medium having stored thereon instructions for processing a 3D model, according to the methods described above.

DETAILED DESCRIPTION

Figure 1A:
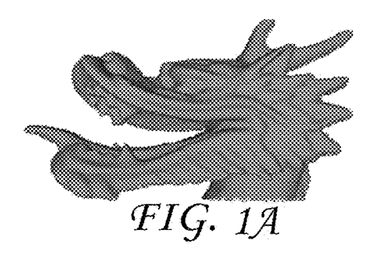
FIGS. 1A, 1B, 1C, and 1D are pictorial examples depicting a noise-free 3D model, the 3D model with noise, a de-noised 3D model using an existing method, and a de-noised 3D model using a method according to the present principles, respectively.
Figure 1B:
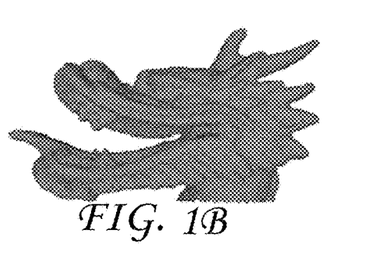
Figure 1C:
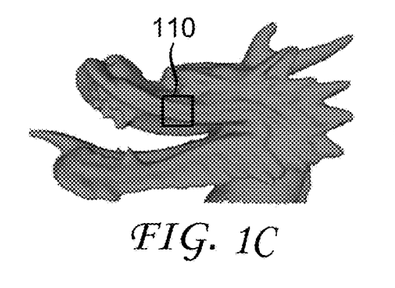

FIG. 1A illustrates a noise-free 3D dragon model. A corresponding 3D model artificially corrupted by Gaussian noise is illustrated in FIG. 1B. In FIG. 1C, the noisy model of FIG. 1B is de-noised using an existing method (which is described further below with respect to TABLE 1), wherein some detailed structure, for example, some details in the box 110, is over smoothed. In general, regions with structure (i.e., large-scale and regular patterns with important visual information, for example, edges and contours in a 2D image, and ridges and valleys in a 3D model) contain important visual information and the structure therein should be preserved.

The present principles are directed to a method and apparatus for processing a 3D model. In particular, structural information of the 3D model is used to design a de-noising filter to retain fine details.

Figure 2:
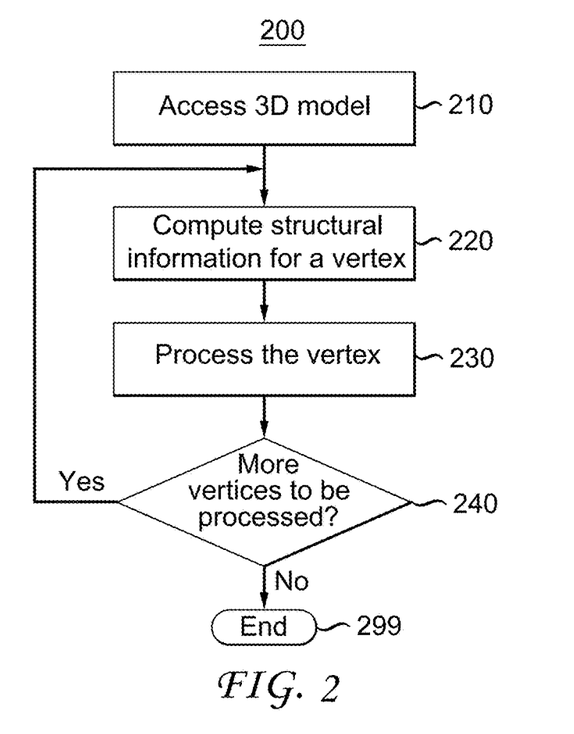
FIG. 2 is a flow diagram depicting an example of processing vertices in a 3D model, in accordance with an embodiment of the present principles.

FIG. 2 illustrates an exemplary method 200 for de-noising a 3D model using structural information. Method 200 starts at step 210, wherein the 3D model is received. For an individual vertex of the 3D model, local structural information is derived based on the neighborhood of the vertex at step 220. Using the structural information, the vertex is processed at step 230, for example, by applying a de-noising filter to the vertex. At step 240, it checks whether more vertices need to be processed. If more vertices are to be processed, control returns to step 220. Otherwise, method 200 ends at step 299.

In the following, the steps of computing (220) structural information and processing (230) the vertex are described in further detail.

Computing Structural Information

Figure 3A:
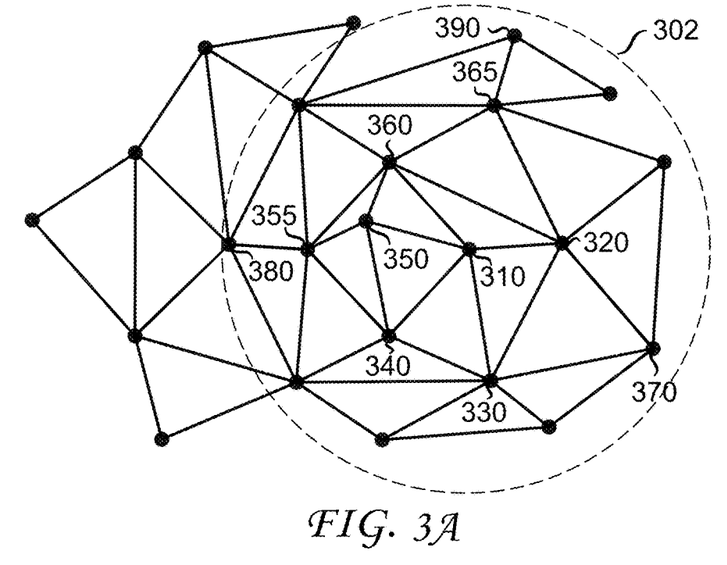
FIGS. 3A and 3B are pictorial examples depicting k-radius neighborhood of vertices, in accordance with an embodiment of the present principles.
Figure 3B:
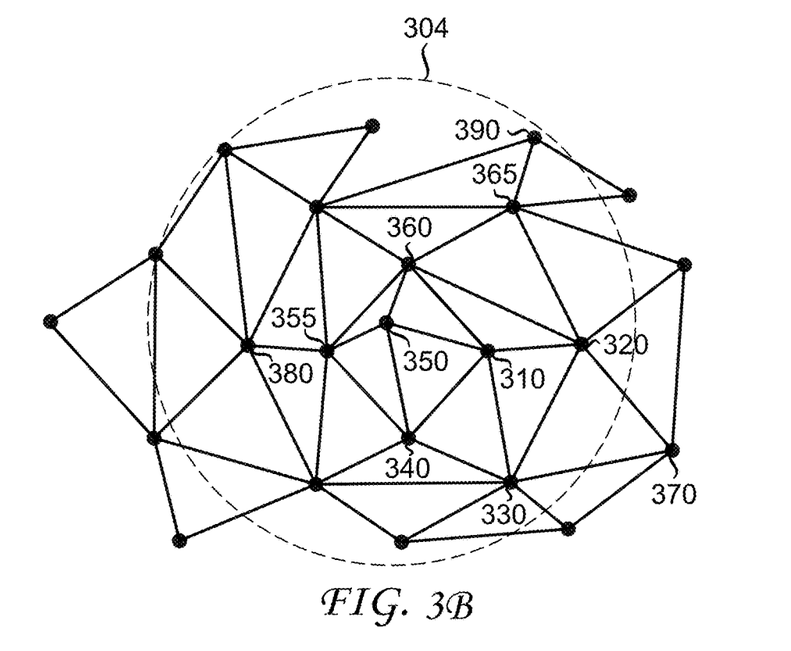

As discussed above, local structural information may be determined using vertices in the neighborhood. In one embodiment, to avoid the effect of mesh irregularity and non-manifold, the spatial neighborhood of vertex v can be determined as vertices bounded in a sphere centered around vertex v with a pre-defined radius. For example, the radius can be computed as k times of the average edge length of an input 3D mesh, that is, $$rad = k \cdot \text{average\_length}(E), \quad (1)$$

where rad is the radius of the sphere, k is a constant, and E represents the set of edges in the mesh. In one example, k may be set to 4 or 5, or other values depending on the size of rad desired. As shown in examples in FIGS. 3A and 3B, vertices inside the circle 302 are determined to be in the k-radius neighborhood of vertex 310, and vertices inside the circle 304 are determined to be in the k-radius neighborhood of vertex 350.

As shown in FIG. 3A, there may exist different paths connecting a neighboring vertex and a current vertex. For example, when vertex 310 is the current vertex to be processed, to connect vertex 310 with a neighboring vertex 370, different paths are available:

310-320-370
310-330-370
310-340-330-370
. . .

Among all the paths, the shortest path is denoted as a geodesic path. For example, the geodesic path between 310 and 370 is the path 310-320-370, the geodesic path between 310 and 380 is the path 310-350-355-380, and the geodesic path between 310 and 390 is the path 310-360-365-390. The geodesic path, also denoted as $G_{Path}$, generally contains multiple mesh edges.

After a geodesic path is determined for the current vertex and a neighboring vertex, geometric variations can be computed for mesh edges along the path. To be general, we denote two vertices of a mesh edge as $v_i$ and $v_j$, respectively. To calculate the geometric variation between $v_i$ and $v_j$, local variations around individual vertices are first computed.

In one embodiment, 1-ring neighborhood is used for computing local variation around a vertex. For the examples shown in FIGS. 3A and 3B, the 1-ring neighborhood for vertex 310 includes vertices 320, 330, 340, 350 and 360. We denote the 1-ring neighborhood of vertex $v_i$ as $N_{1r}(v_i)$, and the number of vertices in the 1-ring neighborhood as $|N_{1r}(v_i)|$. The vertices inside the 1-ring neighborhood are denoted as $v_{i,n} \in (v_i)$, n=1, . . . , $|N_{1r}(v_i)|$.

It is known that eigenanalysis of the covariance matrix of a local neighborhood can be used to estimate local surface properties. The covariance matrix $C_i$ around vertex $v_i$ can be defined as:

$$C_i = \frac{1}{|N_{1r}(v_i)|} \begin{bmatrix} v_{i,1} - v_i \\ \ldots \\ v_{i,n} - v_i \\ \ldots \end{bmatrix}^T \begin{bmatrix} v_{i,1} - v_i \\ \ldots \\ v_{i,n} - v_i \\ \ldots \end{bmatrix}, \quad (2)$$

where $\lambda_1$, $\lambda_2$, and $\lambda_3$ are eigenvalues of the matrix and $\lambda_m$, m=1, 2, 3, measures the variation of $v_{i,n}$, n=1, . . . , $|N_{1r}(v_i)|$, along the direction of the corresponding eigenvector. The mean value of the three eigenvalues can be used to measure the local variation around vertex $v_i$. That is, the local variation around vertex $v_i$ can be calculated as:

$$\alpha_i = \frac{\lambda_1 + \lambda_2 + \lambda_3}{3}. \quad (3\text{-}1)$$

In another embodiment, the location variation can be define as:

$$\alpha_i = \frac{\min(\lambda_1, \lambda_2, \lambda_3)}{\lambda_1 + \lambda_2 + \lambda_3}, \quad (3\text{-}2)$$

where $\alpha_i$ may describe the surface variation at vertex v in the neighborhood.

Subsequently, the geometric variation for the mesh edge connected by $v_i$ and $v_j$, $g(v_i, v_j)$, can be measured using the difference of the local variations, which can be expressed as:

$$g(v_i, v_j) = |\alpha_i - \alpha_j|, \ (v_i, v_j) \in E. \quad (4)$$

Similarly, the geometric variation can be calculated for other mesh edges along the path.

The maximum variation along the path can be defined as:

$$g_{max} = \max_{(v_m, v_n) \in G_{Path}} \{g(v_m, v_n)\}, \quad (5)$$

where $(v_m, v_n)$ is a mesh edge on the geodesic path. In one embodiment, the maximum variation $g_{max}$ can be employed to measure the structural information in the region between two end vertices of the path. Other metrics, for example, but not limited to, the mean value or root mean square value of the geometric variations of the mesh edges, can also be used to measure the structural information.

Figure 4:
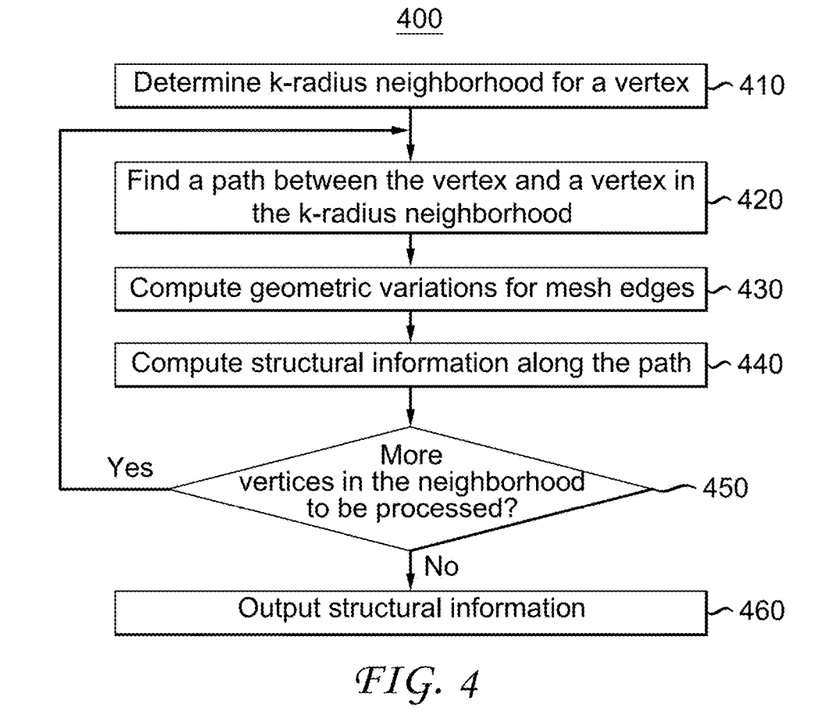
FIG. 4 is a flow diagram depicting an example of determining structural information for a vertex, in accordance with an embodiment of the present principles.

FIG. 4 illustrates an exemplary method 400, which may be used in step 220, for performing structural information computation. At step 410, a k-radius neighborhood is determined for a vertex $v_i$, for example, using Eq. (1). At step 420, a geodesic path is determined between the current vertex $v_i$ and a vertex in the k-radius neighborhood. For each mesh edge along the path, the geometric variation between two vertices connecting the mesh edge is calculated, for example, using Eqs. (2)-(4), at step 430. Along each geodesic path, the structural information is calculated at step 440 based on geometric variations for mesh edges along the path, for example, using Eq. (5). At step 450, it checks whether more vertices in the neighborhood need to be processed. If more vertices are to be processed, the control returns to step 420. Otherwise, the structural information between the current vertex and neighboring vertices is output at step 460.

The operations in method 400 may be varied from what is shown in FIG. 4. For example, step 430 may be performed before step 420. In another example, when a geometric variation for a mesh edge along the path is greater than a pre-defined threshold, the geometric variation computation terminates and geometric variation is not computed for remaining mesh edges. That is, the geometric variation may be computed only for a subset of mesh edges along the path.

The structural information may then be used to process the current vertex. For example, a weight based on the structural information can be defined as:

$$w_g = \exp(-g_{max}^2/(2\sigma_g^2)), \quad (6)$$

where $\sigma_g$ is a parameter of the Gaussian function, which can be the variance of all $g_{max}$ values. When the structural information $g_{max}$ is large, there may exist large geometric variation in the region between the current vertex and its neighboring vertex and we consider these two vertices less similar. Thus, when processing the current vertex, the contribution from this neighboring vertex should be small. That is, when the structural information $g_{max}$ is greater, the structure-related weight $w_g$ is set to be smaller. The structural information $g_{max}$ can also be used to generate weights in other forms.

Advantageously, the structural information and the weight computed according to the present principles can capture relevant structural information in a 3D model. For example, when there are structures (for example, ridges or valleys) in the region between two vertices, the structural information can be captured and the weight function $w_g$ has a small value. In another example, when the geodesic path between the two vertices lies on a plane, the geometric variation for each mesh edge along the path becomes 0 and the weight function value in Eq. (6) becomes 1, indicating that there is no or little structure between two vertices.

In the following, using a bilateral filter and Laplacian filter as examples, we discuss how the structure-related weight can be used to process a current vertex. The present principles can be applied to other filters and processing methods.

Bilateral Filter

In an existing work described in S. Fleishman, I. Drori, and D. Cohen-Or, "Bilateral Mesh Denoising," ACM Transactions on Graphics, vol. 22, num. 3, pages. 950-953, 2003, a bilateral mesh de-noising algorithm is accomplished by filtering vertex positions in the normal direction using k-ring neighborhoods. Specifically, the pseudo-code for applying a bilateral filter to a single vertex v is shown in TABLE 1. As shown in TABLE 1, a closeness parameter (denoted as t) is calculated based on the distance between a vertex v and a neighboring vertex $q_i$, and a similarity parameter (denoted as h) is calculated based on the difference between v and $q_i$ in the normal direction (n). When a bilateral filter is applied to the vertex v, a displacement (denoted as sum/normalizer) is computed using the closeness and similarity parameters (i.e., t and h), based on neighboring vertices ($\{q_i\}_{i=1, \ldots, K}$). Subsequently, the position of vertex v is updated along its normal direction with the computed displacement. That is, after de-noising, the vertex v is updated with $\hat{v}$. In TABLE 1, parameter K denotes the number of neighboring vertices, and $\sigma_s$ and $\sigma_c$ are constants.

TABLE 1

DenoisePoint(Vertex v, Normal n)
$\{q_i\}$ = neighborhood(v)
K = |$\{q_i\}$|
sum = 0
normalizer = 0
for i := 1 to K
    t = ||v − $q_i$||
    h = ⟨n, v − $q_i$⟩
    $w_c$ = exp(−$t^2$/(2$\sigma_c^2$))
    $w_s$ = exp(−$h^2$/(2$\sigma_s^2$))
    sum+= ($w_c \cdot w_s$) · h
    normalizer += $w_c \cdot w_s$
end
return Vertex $\hat{v}$ = v + n · (sum/normalizer)

Using the structure-related weight, for example, the weight described in Eq. (6), the bilateral filter described above can be modified to consider the structural information, as shown in the pseudo-code in TABLE 2. That is, in comparison with the algorithm described in TABLE 1, an additional weight $w_g$ is used when calculating the displacement. The structure-related weight can prevent the algorithm from over smoothing features in a 3D model, and makes the algorithm more robust to irregularity of an input 3D model.

TABLE 2

SmoothPoint(Vertex v, Normal n)
$\{q_i\}$ = neighborhood(v)
K = |$\{q_i\}$|
sum = 0
normalizer = 0
for i := 1 to K
    t = ||v − $q_i$||
    h = ⟨n, v − $q_i$⟩
    $w_c$ = exp(−$t^2$/(2$\sigma_c^2$))
    $w_s$ = exp(−$h^2$/(2$\sigma_s^2$))

TABLE 2-continued

$w_g$ = exp(−$g_{max}^2$/(2$\sigma_g^2$))
    sum+= ($w_g \cdot w_c \cdot w_s$) · h
    normalizer += $w_g \cdot w_c \cdot w_s$
end
return Vertex $\hat{v}$ = v + n · (sum/normalizer)

In another embodiment, the de-noising algorithm can be performed in two stages: normal smoothing and vertex updating. The face normals are first smoothed with consideration of the structural information. Then the vertex position is updated according to the smoothed normals. The de-noising process can be iterated multiple times. TABLE 3 shows the pseudo-code for normal smoothing using the bilateral filter. Rather than introducing an additional weight into the bilateral filter as in TABLE 2, we replace the similarity parameter in the bilateral filter. That is, comparing TABLE 3 with TABLE 1, the similarity parameter h is based on the structural information.

To smooth the face normal, we may construct a dual graph from an input 3D model. Specifically, the nodes of the dual graph are the triangular faces of the input 3D model and edges of the dual graph indicate the adjacency of the triangular faces in the input 3D model. A node in the dual graph can be represented by the centroid of its corresponding face and it becomes the vertex of the new 3D model corresponding to the dual graph. Subsequently, the filter is performed on the new 3D model. In TABLE 3, $n_{q_i}$ denotes the normal of the corresponding triangular face of vertex $q_i$.

TABLE 3

SmoothPoint(Vertex v, Normal n)
$\{q_i\}$ = neighborhood(v)
K = |$\{q_i\}$|
sum = 0
normalizer = 0
for i := 1 to K
    t = ||v − $q_i$||
    h = $g_{max}$(v, $q_i$)
    $w_c$ = exp(−$t^2$/(2$\sigma_c^2$))
    $w_s$ = exp(−$h^2$/(2$\sigma_s^2$))
    sum+= ($w_c \cdot w_s$) · $n_{q_i}$
    normalizer += $w_c \cdot w_s$
end
sum = sum/normalizer After the face normals are smoothed on the dual graph, the vertex coordinates can be updated on the original mesh, that is, $$\hat{v} = v + \frac{1}{|N_f(v)|} \sum_{f_p \in N_f(v_i)} \text{sum}(\text{sum} \cdot (c_p - v)), \quad (7)$$

wherein $f_p$ is a neighboring face of vertex v in the original 3D model, $c_p$ is the vertex in the dual graph corresponding to face $f_p$ in the original 3D model, and $N_f(v)$ denotes the neighboring faces of the vertex v.

Figure 1D:
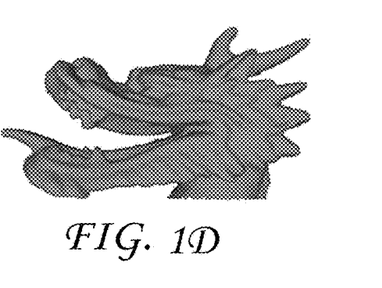
Figure 5A:
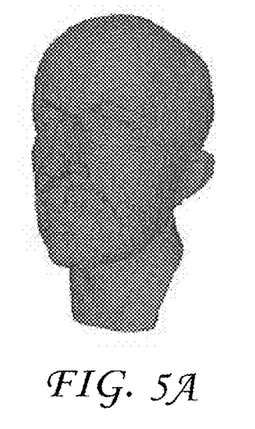
FIGS. 5A, 5B, and 5C are pictorial examples depicting another 3D model with noise, a de-noised 3D model using an existing method, and a de-noised 3D model using a method according to the present principles, respectively.
Figure 5B:
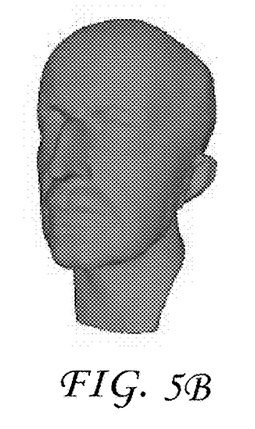
Figure 5C:
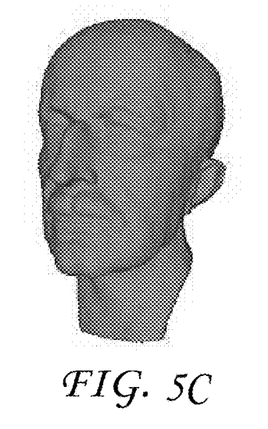

FIG. 1D shows a de-noised 3D dragon model using the method according to the method illustrated in TABLE 3. Compared with the de-noised 3D dragon model using the method according to TABLE 1 (shown in FIG. 1C), FIG. 1D preserves more fine structures. For the noisy model shown in FIG. 5A, the de-noised models using the methods according to TABLEs 1 and 3 are shown in FIGS. 5B and 5C, respectively. Clearly, the de-noised model according to the present principles preserves more fine structures.

Laplacian Filter

In general, a Laplacian smoothing method can be described as:

$$\hat{v} = \frac{1}{\sum w_j} \sum_{p_j \in N(v)} w_j p_j, \quad (8)$$

wherein $w_j$ is a weight measuring similarity between vertices $p_j$ and v. The new position of $\hat{v}$ is computed as a weighted average of its neighboring vertices $p_j$. Considering structural information, Eq. (8) can be modified to:

$$\hat{v} = \frac{1}{\sum w_{g,j} w_j} \sum_{p_j \in N(v)} w_{g,j} w_j p_j, \quad (9)$$

wherein $w_{g,j}$ is the aforementioned structure-related weight.

As described above, to de-noise a 3D model, for a current vertex to be processed, a number of neighboring vertices are used to update its property, for example, but not limited to, the position and normal. Essentially, the de-noising progress is guided by different contributions from neighboring vertices to update the current one. Existing methods often only consider similarity between two vertices, and thus, are sensitive to the size of the neighborhood. That is, if the size of neighborhood is too small, it is hard to remove the noise. If the size is too large, it tends to oversmooth the surface details. It is challenging to select a good size of neighborhood.

The structure-related weight takes into account the geometric variations in the region between a vertex and its neighboring vertex. If there exists significant structure or geometric variation along the geodesic path between two vertices, we consider that there exist local structures in the region between the two vertices and the contribution of the neighboring vertex is set to be smaller by using a smaller structure-related weight. Thus, the de-noising methods according to the present principles can tolerate larger size of neighborhood while avoiding oversmoothing the surface details.

In the above discussions, k-radius neighborhood and the geodesic path between two vertices are used when computing the structural information. Alternatively, the neighborhood can be determined as the near vertices using other measurements. Other types of paths, for example, but not limited to, the set of edges along the direction with minimal curvature variation or local variation, can be used to determine the structural information. Moreover, the path is not necessarily restricted along mesh edges. If more sampling points are interpolated on the mesh edges or inside the faces, the detected path may cross the mesh edges, where the geometric variations are interpolated accordingly.

In the above discussions, we also assume that mesh edges are available in the 3D model and they are used for calculating the radius of k-radius neighborhood, determining two vertices connecting a mesh edge in order to calculate the geometric variation, and searching for a geodesic path to derive structural information. However, in a 3D point-based model, connectivity is not readily available and the structural information computation needs to be adjusted.

In one embodiment, the neighborhood of a vertex can be determined using a sphere centered around the vertex with a pre-defined radius. To obtain the geodesic path, a proximity graph, that is, an estimated local 3D mesh around the vertex, can be constructed for the current vertex and its neighboring vertices, then the geodesic path between the current vertex and its neighboring vertices can be approximated using the methods described before based on proximity graph. For a segment of the geodesic path, the geometric variation is defined as the difference of the local variations around its two end points. Other operations, for example, determining the structural information along the geodesic path between the current vertex and a neighboring vertex can be computed in the same manner as what is describe before, for example, as the maximum geometric variation along the path.

The de-noising method according to the present principles can be used in a pre-processor to remove noise in a 3D model, for example, before the 3D model is sent to an encoder for compression. The de-noising can also be used in a post-processor, for example, to remove compression noise in a compressed 3D model.

Figure 6:
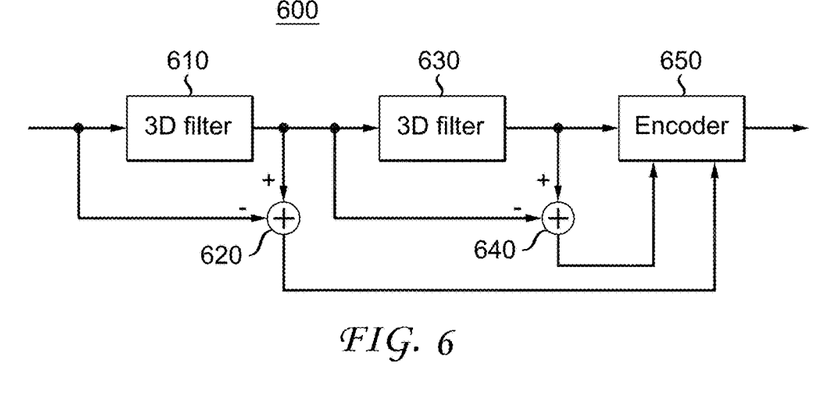
FIG. 6 is a block diagram depicting an example of a 3D encoder, in accordance with an embodiment of the present principles.

In addition, the present principles can also be used in other 3D model processing applications. In FIG. 6, an exemplary encoder 600 using multi-scale representation is illustrated. The input of apparatus 600 includes a 3D model to be compressed. A 3D filter 610, for example, but not limited to, the Bilateral filter as shown in TABLEs 2 and 3 and the Laplacian filter as in Eq. (9), filters the 3D model and generates the low-frequency component. Taking the difference between the input 3D model and the low-frequency component at the adder 620, the high-frequency component of the input 3D model is obtained. The 3D filter 630 and the adder 640 further decompose the low-frequency component (output from 610) of the input 3D model into high-frequency details (output of 640) and low-frequency component (output of 630). The outputs from 620, 630, and 640 are then compressed at encoder 650. In the encoder apparatus 600, two iterations are used to generate the multi-scale representation of the input 3D model. If necessary, the decomposition may continue with more iterations.

Figure 7:
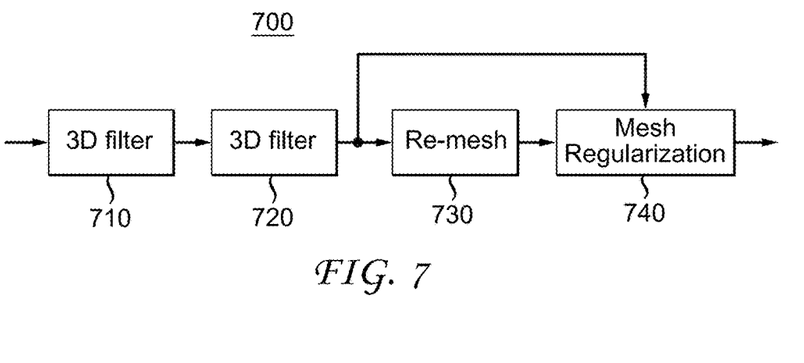
FIG. 7 is a block diagram depicting an example of a 3D mesh regularizing module, in accordance with an embodiment of the present principles.

Moreover, the present principles can also be used for mesh regularization. FIG. 7 depicts a block diagram of an exemplary apparatus 600 for mesh regularization. A 3D filter 710 removes noise in an input 3D mesh model, and another 3D filter 720 decomposes the 3D mesh into high-frequency details and low-frequency components. To preserve details on the regularized mesh, the filtered mesh with low-frequency component is re-meshed at a re-meshing module 730. Then the high-frequency details is added to their corresponding vertices at a mesh regularizing module 740.

Figure 8:
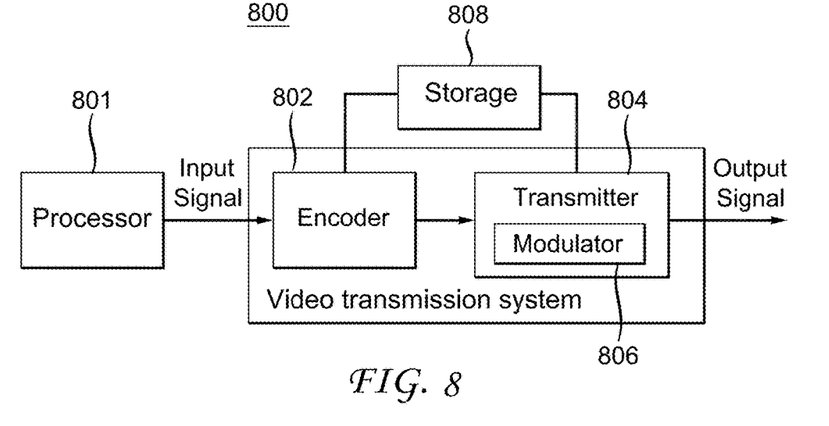
FIG. 8 is a block diagram depicting an example of an image processing system that may be used with one or more implementations.

Referring now to FIG. 8, a video transmission system or apparatus 800 is shown, to which the features and principles described above may be applied. The video transmission system or apparatus 800 may be, for example, a head-end or transmission system for transmitting a signal using any of a variety of media, such as, for example, satellite, cable, telephone-line, or terrestrial broadcast. The video transmission system or apparatus 800 also, or alternatively, may be used, for example, to provide a signal for storage. The transmission may be provided over the Internet or some other network. The video transmission system or apparatus 800 is capable of generating and delivering, for example, video content and other content such as, for example, 3D video data. It should also be clear that the blocks of FIG. 8 provide a flow diagram of a video transmission process, in addition to providing a block diagram of a video transmission system or apparatus.

The video transmission system or apparatus 800 receives input 3D video data from a processor 801. In one implementation, the processor 801 de-noises the 3D model as described in FIGS. 2 and 4 or other variations. The processor 801 may also provide metadata to the video transmission system or apparatus 800 indicating, for example, the resolution of the input video image, the de-noising method, and the metadata associated with the de-noising method.

The video transmission system or apparatus 800 includes an encoder 802 and a transmitter 804 capable of transmitting the encoded signal. The encoder 802 receives video information from the processor 801. The video information may include, for example, 3D model, video images, and/or disparity (or depth) images. The encoder 802 generates an encoded signal(s) based on the input video.

The encoder 802 may include sub-modules, including for example an assembly unit for receiving and assembling various pieces of information into a structured format for storage or transmission. The various pieces of information may include, for example, coded or uncoded video, coded or uncoded disparity (or depth) values, and syntax elements. In some implementations, the encoder 802 includes the processor 801 and therefore performs the operations of the processor 801. The transmitter 804 receives the encoded signal(s) from the encoder 802 and transmits the encoded signal(s) in one or more output signals. The transmitter 804 may be, for example, adapted to transmit a program signal having one or more bitstreams representing encoded pictures and/or information related thereto. Typical transmitters perform functions such as, for example, one or more of providing error-correction coding, interleaving the data in the signal, randomizing the energy in the signal, and modulating the signal onto one or more carriers using a modulator 806. The transmitter 804 may include, or interface with, an antenna (not shown). Further, implementations of the transmitter 804 may be limited to the modulator 806.

The video transmission system or apparatus 800 is also communicatively coupled to a storage unit 808. In one implementation, the storage unit 808 is coupled to the encoder 802, and stores an encoded bitstream from the encoder 802. In another implementation, the storage unit 808 is coupled to the transmitter 804, and stores a bitstream from the transmitter 804. The bitstream from the transmitter 804 may include, for example, one or more encoded bitstreams that have been further processed by the transmitter 804. The storage unit 808 is, in different implementations, one or more of a standard DVD, a Blu-Ray disc, a hard drive, or some other storage device.

Figure 9:
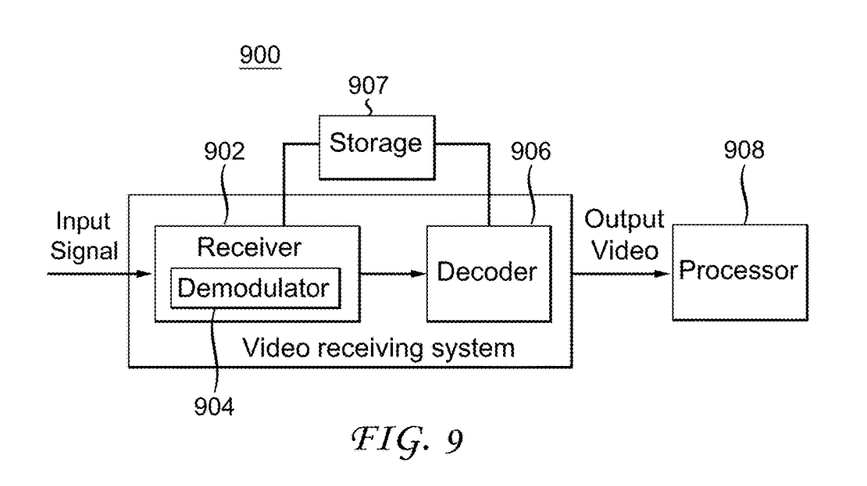
FIG. 9 is a block diagram depicting another example of an image processing system that may be used with one or more implementations.

Referring now to FIG. 9, a video receiving system or apparatus 900 is shown to which the features and principles described above may be applied. The video receiving system or apparatus 900 may be configured to receive signals over a variety of media, such as, for example, storage device, satellite, cable, telephone-line, or terrestrial broadcast. The signals may be received over the Internet or some other network. It should also be clear that the blocks of FIG. 9 provide a flow diagram of a video receiving process, in addition to providing a block diagram of a video receiving system or apparatus.

The video receiving system or apparatus 900 may be, for example, a cell-phone, a computer, a set-top box, a television, or other device that receives encoded video and provides, for example, decoded video signal for display (display to a user, for example), for processing, or for storage. Thus, the video receiving system or apparatus 900 may provide its output to, for example, a screen of a television, a computer monitor, a computer (for storage, processing, or display), or some other storage, processing, or display device.

The video receiving system or apparatus 900 is capable of receiving and processing video information, and the video information may include, for example, 3D models, video images, and/or disparity (or depth) images. The video receiving system or apparatus 900 includes a receiver 902 for receiving an encoded signal. The receiver 902 may receive, for example, a signal providing one or more of a 3D video, or a signal output from the video transmission system 800 of FIG. 8.

The receiver 902 may be, for example, adapted to receive a program signal having a plurality of bitstreams representing encoded pictures. Typical receivers perform functions such as, for example, one or more of receiving a modulated and encoded data signal, demodulating the data signal from one or more carriers using a demodulator 904, de-randomizing the energy in the signal, de-interleaving the data in the signal, and error-correction decoding the signal. The receiver 902 may include, or interface with, an antenna (not shown). Implementations of the receiver 902 may be limited to the demodulator 904.

The video receiving system or apparatus 900 includes a decoder 906. The receiver 902 provides a received signal to the decoder 906. The signal provided to the decoder 906 by the receiver 902 may include one or more encoded bitstreams. The decoder 906 outputs a decoded signal, such as, for example, decoded video signals including video information.

The video receiving system or apparatus 900 is also communicatively coupled to a storage unit 907. In one implementation, the storage unit 907 is coupled to the receiver 902, and the receiver 902 accesses a bitstream from the storage unit 907. In another implementation, the storage unit 907 is coupled to the decoder 906, and the decoder 906 accesses a bitstream from the storage unit 907. The bitstream accessed from the storage unit 907 includes, in different implementations, one or more encoded bitstreams. The storage unit 907 is, in different implementations, one or more of a standard DVD, a Blu-Ray disc, a hard drive, or some other storage device.

The output video from the decoder 906 is provided, in one implementation, to a processor 908. The processor 908 is, in one implementation, a processor configured for de-noising 3D models, for example, according to the methods described in FIGS. 2 and 4 and other variations. In some implementations, the decoder 906 includes the processor 908 and therefore performs the operations of the processor 908. In other implementations, the processor 908 is part of a downstream device such as, for example, a set-top box or a television.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A computer implemented method for de-noising a 3D model, comprising:
   accessing a two dimensional image content by a processor configured to process image content information using structural information;
   determining a shortest geodesic path based on said two dimensional image, wherein said shortest geodesic path has multiple mesh edges by said processor to identify a set of mesh edges amongst said multiple mesh edges connecting a first vertex of the 3D model and a second vertex of the 3D model wherein the set of mesh edges is determined responsive to at least one of a distance between the first vertex and the second vertex, curvature variation, and local variation;
   constructing a proximity graph for the first vertex, wherein estimated mesh edges of the proximity graph are used to determine the set of mesh edges;
   determining a respective geometric variation for each one of a plurality of edges, the plurality of edges belonging to the set of mesh edges;
   determining structural information relating to the 3D model in a neighborhood around the first vertex of the 3D model responsive to the respective geometric variations by calculating geometric variations along the shortest geodesic path established based on spatial relationship between the first and the second vertex; and
   processing the first vertex in response to the structural information relating to the 3D model.

2. The method of claim 1, wherein the structural information is determined to be one of a maximum of the respective geometric variations, a mean value of the respective geometric variations, and a root mean square value of the respective geometric variations.

3. The method of claim 2, wherein the respective geometric variation is determined in response to eigenvalues of a covariance matrix.

4. The method of claim 1, further comprising:
   determining a weight in response to the structural information, wherein the processing step is responsive to the weight.

5. The method of claim 1, wherein a bilateral filter or a Laplacian filter is used for the processing step.

6. The method of claim 1, wherein at least one of a position and a normal of the first vertex is processed in the processing step.

7. An apparatus for de-noising a 3D model, comprising:
   a filter having a processor configured to access a two dimensional image content using structural information;
   determine a shortest geodesic path based on said two dimensional image, wherein said shortest geodesic path has multiple mesh edges by said processor to identify a set of mesh edges amongst said multiple mesh edges connecting a first vertex of the 3D model and a second vertex of the 3D model wherein the set of mesh edges is determined responsive to at least one of a distance between the first vertex and the second vertex, curvature variation, and local variation;
   construct a proximity graph for the first vertex, wherein estimated mesh edges of the proximity graph are used to determine the set of mesh edges;
   determine a respective geometric variation for each one of a plurality of edges, the plurality of edges belonging to the set of mesh edges;
   determine structural information relating to the 3D model in a neighborhood around a the first vertex of the 3D model responsive to the respective geometric variations by calculating geometric variations along the shortest a geodesic path established based on spatial relationship between the first and the second vertex; and
   process the first vertex in response to the structural information relating to the 3D model.

8. The apparatus of claim 7, wherein the structural information is determined to be one of a maximum of the respective geometric variations, a mean value of the respective geometric variations, and a root mean square value of the respective geometric variations.

9. The apparatus of claim 8, wherein the respective geometric variation is determined in response to eigenvalues of a covariance matrix.

10. The apparatus of claim 7, wherein the filter is further configured to determine a weight in response to the structural information, wherein the first vertex is processed responsive to the weight.

11. The apparatus of claim 7, wherein a bilateral filter or a Laplacian filter is used for processing the first vertex.

12. The apparatus of claim 7, wherein at least one of a position and a normal of the first vertex is processed.

* * * * *